United States Patent [19]
Tan

[11] Patent Number: 5,815,109
[45] Date of Patent: Sep. 29, 1998

[54] TRANSMITTER/RECEIVER MODULE OF CORDLESS KEYBOARD ASSEMBLY

[75] Inventor: Tom Tan, Taipei, Taiwan

[73] Assignee: Behavior Tech Computer Corporation

[21] Appl. No.: 916,783

[22] Filed: Aug. 25, 1997

[51] Int. Cl.[6] .................................................. G08C 19/12
[52] U.S. Cl. .............................. 341/177; 341/31; 341/22; 340/825.57; 345/169; 361/683; 364/189
[58] Field of Search ..................................... 361/680, 683, 361/685, 686; 345/158, 169, 156; 341/31, 176, 177, 22; 340/825.57, 825.56, 825.71, 825.73; 364/188, 189

[56] References Cited

U.S. PATENT DOCUMENTS

| | | | |
|---|---|---|---|
| 5,379,184 | 1/1995 | Barraza et al. | 361/685 |
| 5,526,023 | 6/1996 | Sugimoto et al. | 345/156 |
| 5,724,106 | 3/1998 | Autry et al. | 345/158 |

*Primary Examiner*—Michael Horabik
*Assistant Examiner*—Timothy Edwards, Jr.
*Attorney, Agent, or Firm*—Rosenberg, Klein & Bilker

[57] ABSTRACT

A transmitter/receiver module of cordless keyboard assembly adapted to be received and fixed inside a disk driver slot provided on the front panel of a computer casing is disclosed, including a frame sized to be received within the disk driver slot, having two lateral sides each having a slot opposite to each other for receiving a transmitter/receiver circuit module in the form of a circuit board which includes an encoder for setting the operation frequency of the transmitter/receiver circuit by means of at least one manually depressible button provided on the circuit module. The circuit module also has a display for showing the operation frequency thereof. A cover lid made of a material through which the signal from/toward the transmitter/receiver circuit module is transmittable is provided to cover the front opening of the frame. The cover lid is provided with an opening for access to the depessible button and observation of the display. The frame has a resilient catch provided on each of the two lateral sides thereof for engaging side wall of the disk driver slot for fixing the transmitter/receiver module therein.

7 Claims, 3 Drawing Sheets

TRANSMITTER/RECEIVER MODULE OF CORDLESS KEYBOARD ASSEMBLY

FIELD OF THE INVENTION

The present invention relates to a transmitter/receiver module of cordless keyboard assembly and in particular to an infra-red signal transmitter/receiver module adapted to be mounted within a disk drive slot formed on the front panel of a computer casing.

BACKGROUND OF THE INVENTION

Computers have been widely used in all kinds of business to perform a variety of tasks, such as commercial transactions, communications and word processing which are quite labor-consuming jobs in the past without computers. Thus, the computers are nowadays of vital important for human society, especially for industrialized modern society. One of the most important machine-human interfaces for the computers is a keyboard which is also the most common and conventional computer input device. Whether or not a keyboard may be operated in a convenient and efficient way is critical to the operation and use of the computer.

Conventionally, the keyboard is connected to the computer via a cable which limits the position and the operation of the keyboard. To overcome such a problem, a cordless keyboard assembly has been developed, which is in general based on transmission of infra-red signal to communicate between the computer and the keyboard. To transmit and receive the infra-red signal, both the computer and the keyboard have to be equipped with an infra-red transmitter/receiver module.

Such an infra-red signal transmission system, although providing a more convenient and cordless manner of signal communication between the computer and the keyboard, has to be mounted outside the computer casing and coupled to the computer main circuit board by means of additional wires or cables. Such wires or cables connected between the infra-red transmitter/receiver module and the computer circuit board also cause a management problem of the wires for a great portions thereof are located outside the computer casing. Further, since the infra-red transmitter/receiver module is heretofore arbitrarily mounted on the computer casing, an effective communication via infra-red signals between the computer and the keyboard may be obtained only when is the keyboard is positioned within a certain area determined by the location of the infra-red transmitter/receiver on the computer casing and such an area is usually very limited. Thus, there is still inconvenience in using the conventional cordless keyboard assembly.

It is thus desirable t o provide a transmitter/receiver module arrangement for the cordless keyboard assembly in order to overcome the problems encountered in the prior art cordless keyboard assembly.

SUMMARY AND OBJECTS OF THE INVENTION

Therefore, the primary object of the present invention is to provide a transmitter/receiver module of cordless keyboard assembly, which is capable to be received and fixed inside a disk driver slot that is provided on the front panel of the computer casing so as to eliminate the wires that are exposed outside the computer to connect the transmitter/receiver module to the computer circuit board and thus the wiring management problem encountered in the prior art design in which the transmitter/receiver is fixed on an outside surface of the computer casing.

Another object of the present invention is to provide a transmitter/receiver module of cordless keyboard assembly wherein the transmitter/receiver module is received and fixed inside a disk driver slot provided on the front panel of the computer casing so as to reduce the space needed in mounting the transmitter/receiver outside the computer casing.

A further object of the present invention is to provide a transmitter/receiver module of cordless keyboard assembly which is received and fixed inside a disk driver slot formed on the front panel of the computer casing so as to allow the counterpart transmitter/receiver module mounted on the keyboard to be ready to face and align with the computer side transmitter/receiver module and thus providing a broader range within which the keyboard may be positioned to obtain an effective communication with the computer.

To achieve the above objects, in accordance with the present invention, there is provided a transmitter/receiver module of cordless keyboard assembly adapted to be received and fixed inside a disk driver slot provided on the front panel of a computer casing, comprising a frame sized to be received within the disk driver slot, having two lateral sides each having a slot opposite to each other for receiving a transmitter/receiver circuit module in the form of a circuit board which includes an encoder for setting the operation frequency of the transmitter/receiver circuit by means of at least one manually depressible button provided on the circuit module. The circuit module also has a display for showing the operation frequency thereof. A cover lid made of a material through which the signal from/toward the transmitter/receiver circuit module is transmittable is provided to cover the front opening of the frame. The cover lid is provided with an opening for access to the depessible button and observation of the display. The frame has a resilient catch provided on each of the two lateral sides thereof for engaging side wall of the disk driver slot for fixing the transmitter/receiver module therein.

BRIEF DESCRIPTION OF THE DRAWINGS

The above and other objects, advantages and features of the present invention will be readily apparent from the following detailed description of a preferred embodiment of the invention, with reference to the accompanying drawings, wherein.

DETAILED DESCRIPTION OF THE PREFERRED EMBODIMENT

Figure 1:
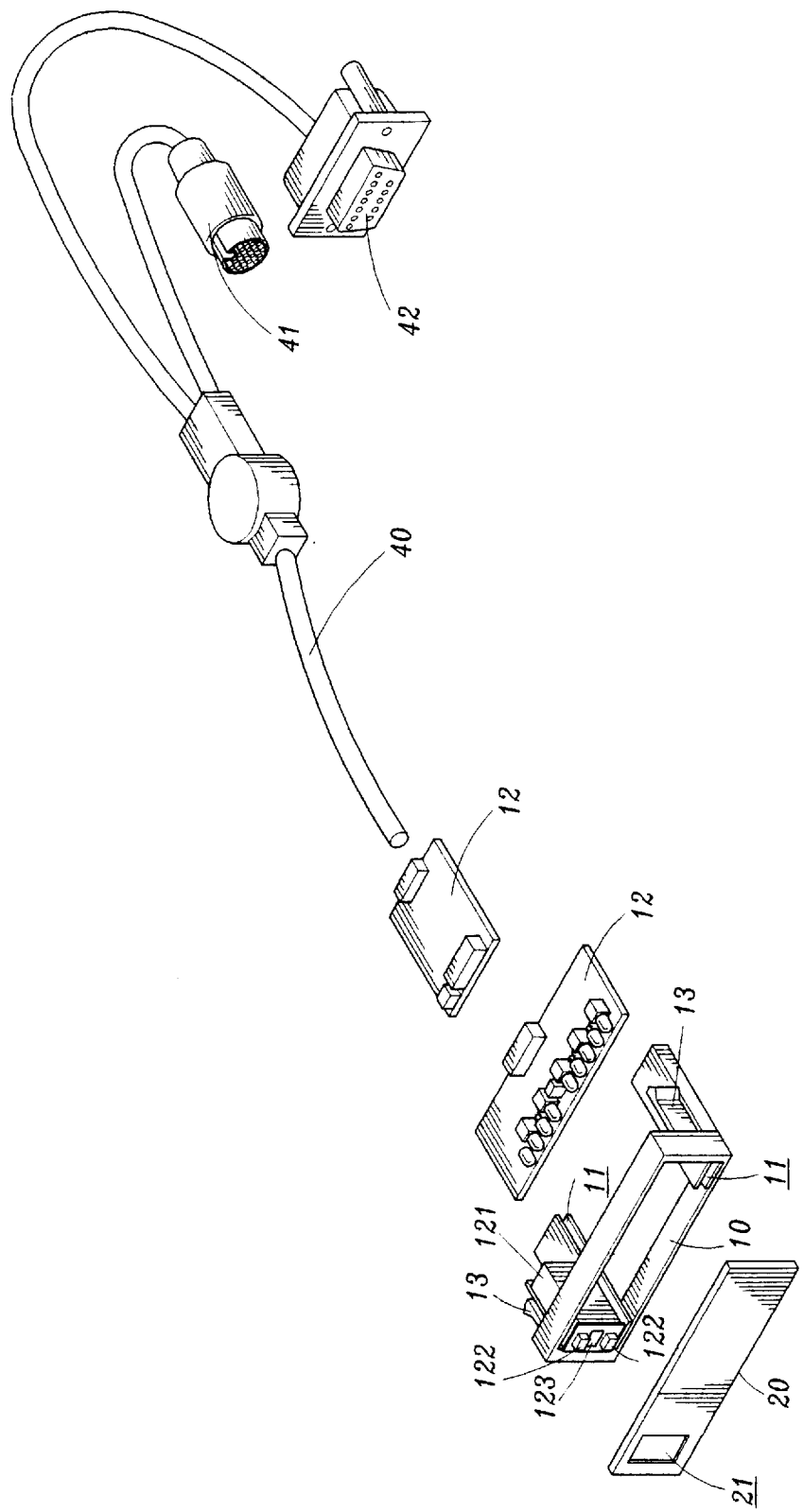
FIG. 1 is an exploded perspective view showing a transmitter/receiver module of cordless keyboard assembly constructed in accordance with the present invention, which is adapted to be received within a disk driver slot provided on a front panel of a computer casing.

With reference to the drawings and in particular to FIG. 1, wherein a transmitter/receiver module of cordless key board assembly for a computer system is shown, the transmitter/receiver module which is adapted to be mounted inside a disk driver slot B that is formed on a computer casing A (so that it will also be referred to as "computer side transmitter/receiver module" hereinafter), see FIGS. 4 and 5, comprises a rectangular frame 10 having a size substantially complementary to the disk driver slot B to be received therein. The frame 10 has formed on each of two lateral sides thereof a slot 11 opposite to each other for receiving and holding therein a transmitter/receiver circuit module 12, preferably in the form of a circuit board as shown in FIG. 1. The circuit module 12 itself does not constitute any novel part of the present invention and will only be described to such an extent sufficient to understand the present invention.

The circuit module 12 comprises an encoder 121 which includes at least one push button 122 to be manually depressible for adjusting the operation frequency of the transmitter/receiver circuit module 12 and a display 123 for showing the frequency. In the embodiment illustrated, there are two such push buttons 122 provided on the encoder 121.

The frame 10 has two resilient catches 13 located on the two opposite lateral sides thereof to engage the side walls of the disk driver slot B of the computer casing A for holding the frame 10 therein. A cover lid 20 made of a material through which the infra-red signal from/toward the transmitter/receiver circuit module 12 may transmit is mounted to the front side of the frame 10 for covering the front side opening thereof and providing an aesthetic appearance of the computer casing A. The cover lid 20 is provided with an opening 21 opposite to the display 123 and the at least one push button 122 for observation of the display 123 and access to the push button 122.

The computer side transmitter/receiver module 12 is electrically connected to a circuit board (not shown) of the computer, which may be a computer main board, via a control circuit 30 for transmission of signals therebetween. The control circuit 30 is provided with a cable 40 having a proximal end directly mounted to the control circuit 30 and a distal end having two output plugs 41 and 42 which are respectively configured to be fit into a conventional keyboard connector and a conventional mouse connector mounted on the circuit board of the computer to respectively supply keyboard signal and mouse signal to the computer circuit board. Since the computer side transmitter/receiver module 12 is received within the disk driver slot B inside the computer casing A and since the computer circuit board (the main board) is also located inside the computer casing A, the cable 40 is completely encased by the computer casing A so that the wiring management problem encountered in the prior art design of cordless keyboard assembly is eliminated.

Figure 2:
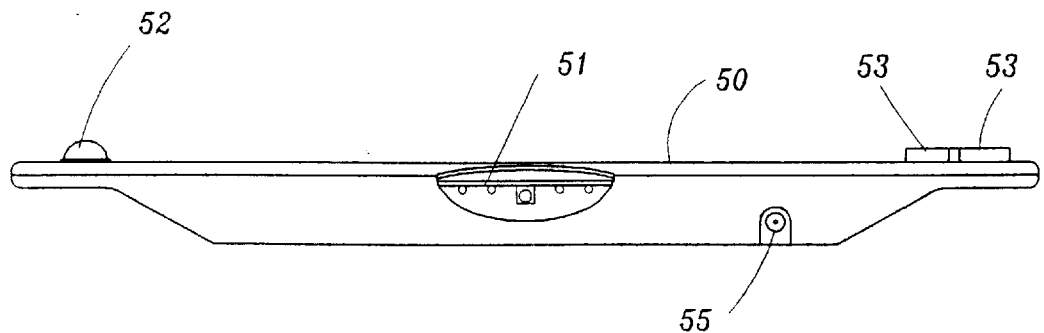
FIG. 2 is a rear view of a keyboard on which a keyboard side transmitter/receiver module of the cordless keyboard assembly is mounted, showing the transmitter/receiver module and the external power source jack.
Figure 3:
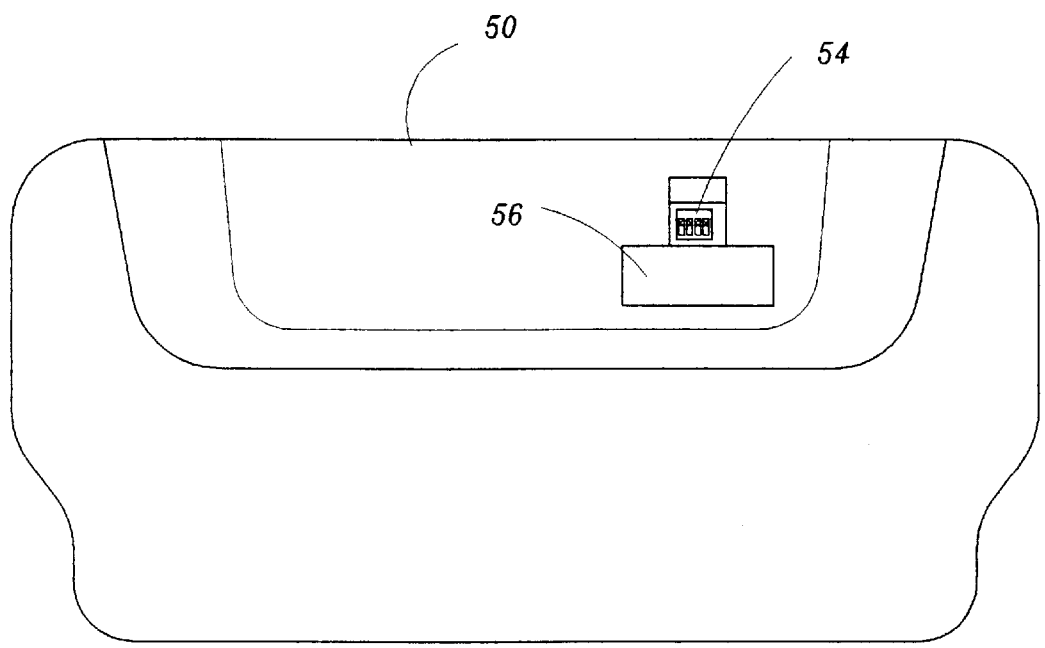
FIG. 3 is a bottom view of the keyboard shown in FIG. 2, showing the frequency selector of the keyboard side transmitter/receiver module.
Figure 4:
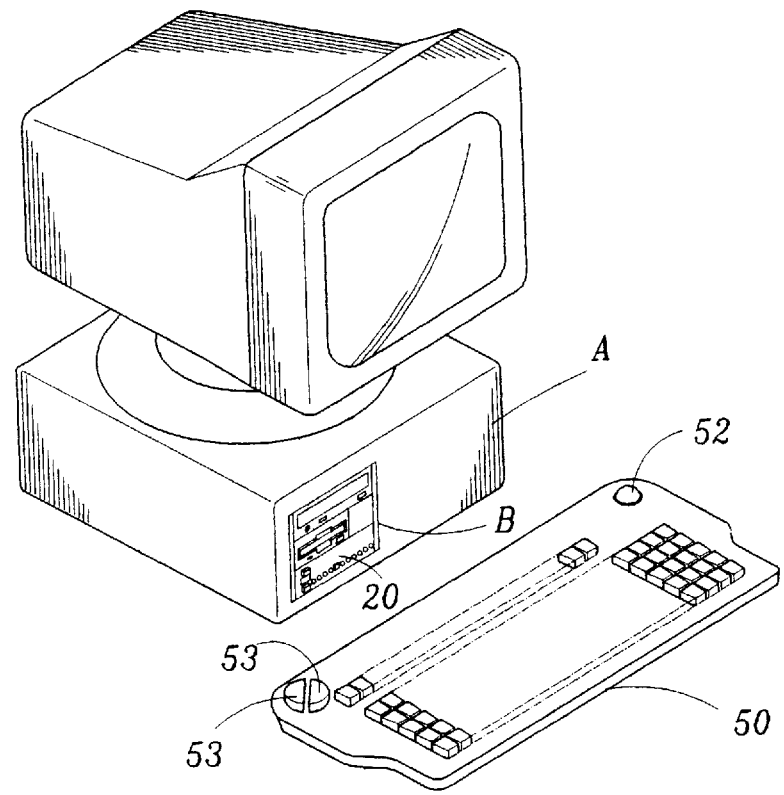
FIG. 4 is a perspective view showing a flat type computer system in which the transmitter/receiver module of the present invention is incorporated to the cordless keyboard assembly thereof.

Further referring to FIGS. 2–4, in using the computer side transmitter/receiver module 12 shown in FIG. 1, the computer side transmitter/receiver module 12 may be mounted in a computer as shown in FIG. 4. To communicate with the computer side transmitter/receiver module 12, the cordless keyboard assembly also comprises a counterpart transmitter/receiver module 51 mounted on a keyboard body 50. The counterpart transmitter/receiver module 51, which will also be referred to as "keyboard side transmitter/receiver module", is corresponding to the computer side transmitter/receiver module to establish signal communication therebetween. The keyboard body 50 may be provided with a track ball 52 and positioning keys 53 and the signals from the track ball 52 and the positioning keys 53 are transmitted through the keyboard side transmitter/receiver module 51 and the computer side transmitter/receiver module 12 to the computer main board.

The keyboard side transmitter/receiver module 51 may comprise a frequency selector 54, see FIG. 3, which allows a selection of different operation frequencies of the keyboard side transmitter/receiver module 51 so as to be consistent with the frequency set by the encoder 121 of the computer side transmitter/receiver module 12. The keyboard body 50 may be powered by an external power source (not shown) which is connected thereto by means of a jack 55, see FIG. 2, provided on the keyboard body 50. Alternatively, the keyboard body 50 may be powered by a battery set (not shown) received and held within a battery chamber 56, see FIG. 2, formed inside the keyboard body 50.

FIG. 4 shows a flat or horizontal type computer system having a computer casing A inside which the computer side transmitter/receiver module 12 in accordance with the present invention is mounted. The frame 10, together with the transmitter/receiver module 12, is received and held inside the disk driver slot B of the compute casing A so that the wires or cables connected between the transmitter/receiver module 12 and the computer main board is hidden inside the computer casing A, which not only eliminates the wire management problem, but also reduces the cost of the wire for the wire length is also reduced by being encased inside the casing A. Also, the interference in transportation of the computer caused by the wire exposed outside the casing in the prior art designs may also be reduced. Further, the arrangement of the computer side transmitter/receiver module 12 inside the disk driver slot on the front panel of the computer casing allows the keyboard body 50 and the keyboard side transmitter/receiver 51 to be positionable within a larger area without deteriorating the communication quality between the keyboard and the computer so that a greater flexibility in positioning the keyboard body may be obtained.

Figure 5:
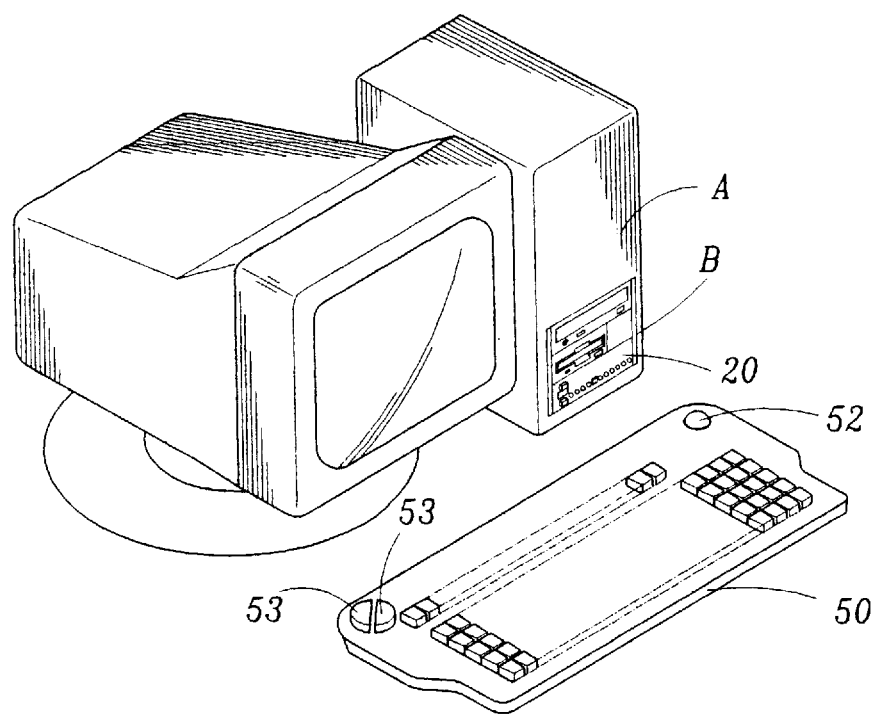
FIG. 5 is a perspective view showing an upright type computer system in which the transmitter/receiver module of the present invention is incorporated in the cordless keyboard assembly thereof.

FIG. 5 shows a similar application, but is carried out on an upright or vertical type computer. Similarly, the transmitter/receiver module 12 in accordance with the present invention is received and held within the disk driver slot B provided on the front panel of the computer casing A so as to provide a similar benefit that is obtained in the embodiment illustrated in FIG. 4.

The above description is made with respect to the preferred embodiment of the present invention and for those skilled in the art, it is possible to made a variety of modifications and changes to the above-described embodiment without departing from the scope and spirit of the present invention. All these modifications and changes should be considered within the scope of the present invention as defined in the appended claims.

What is claimed is:

1. A transmitter/receiver module of cordless keyboard assembly comprising a frame which is sized to be received within a disk driver slot formed on a front panel of a computer casing, the frame having two opposite lateral sides each having a slot opposite to each other to receive and hold therein a transmitter/receiver circuit module therein, each of the two lateral sides having a resilient catch provided thereon to respectively engage a side wall of the disk driver slot so as to hold the frame in the disk driver slot, the circuit module being connected to a computer circuit board via a control circuit which comprises an output cable having one end electrically connected to the control circuit and an opposite end electrically connected to the computer circuit board.

2. The transmitter/receiver module as claimed in claim 1, further comprising a cover lid to cover a front opening of the frame through which signal from/toward the transmitter/receiver module is transmittable.

3. The transmitter/receiver module as claimed in claim 1, wherein the transmitter/receiver circuit module comprises an encoder positioned within the frame for setting operation frequency of the transmitter/receiver circuit module.

4. The transmitter/receiver module as claimed in claim 3, wherein the encoder comprises at least one push button manually depressible to set the operation frequency thereof.

5. The transmitter/receiver module as claimed in claim 4, further comprising a cover lid to cover a front opening of the frame through which signal from/toward the transmitter/receiver module is transmittable, the cover lid comprising an opening through which the display is visually observable.

6. The transmitter/receiver module as claimed in claim 3, wherein the encoder comprises a display for showing the operation frequency thereof.

7. The transmitter/receiver module as claimed in claim 3, further comprising a cover lid to cover a front opening of the frame through which signal from/toward the transmitter/receiver module is transmittable, the cover lid comprising an opening through which the push button is manually accessible.

* * * * *